US006935841B2

(12) United States Patent
Rainbow

(10) Patent No.: US 6,935,841 B2
(45) Date of Patent: Aug. 30, 2005

(54) FAN ASSEMBLY

(76) Inventor: Michael Mark Rainbow, Arup 5th Floor, The Frontage, Queen St., Nottingham (GB), NG1 2BL ( * ) Notice: Subject to any disclaimer, the term of this patent is extended or adjusted under 35 U.S.C. 154(b) by 0 days.

(21) Appl. No.: 10/433,679

(22) PCT Filed: Dec. 4, 2001

(86) PCT No.: PCT/IB01/02291
§ 371 (c)(1),
(2), (4) Date: Dec. 1, 2003

(87) PCT Pub. No.: WO02/46619
PCT Pub. Date: Jun. 13, 2002

(65) Prior Publication Data
US 2004/0071541 A1 Apr. 15, 2004

(30) Foreign Application Priority Data
Dec. 4, 2000 (ZA) .......................................... 2000/7154

(51) Int. Cl.[7] ............................................... F03D 3/02
(52) U.S. Cl. .......................... 416/175; 415/4.5; 415/62; 415/124; 416/51; 416/126; 416/169 R; 416/198 R; 416/201 A; 416/147; 416/124; 416/176
(58) Field of Search .............................. 415/4.5, 62, 66, 415/68, 72, 123, 208.2, 8, 12, 13; 416/44–46, 52–53, 124, 126, 147, 169 R, 175, 197 A, 197 B, 198 R, 201 A, DIG. 9, 139, 23, 140, 119, 167, 168 R, 277 A; 290/44, 55

(56) References Cited

U.S. PATENT DOCUMENTS

| 1,702,120 | A | * | 2/1929 | Kimball ....................... 454/19 |
| 2,013,244 | A | * | 9/1935 | La Vergne ................... 454/15 |
| 4,200,035 | A | * | 4/1980 | Zaniewski ................... 454/16 |
| 4,303,375 | A | * | 12/1981 | Foglesong et al. .......... 416/167 |
| 4,414,477 | A | * | 11/1983 | Mewburn-Crook et al. ... 290/55 |
| 4,423,333 | A | * | 12/1983 | Rossman ..................... 290/44 |
| 4,641,571 | A | * | 2/1987 | Anderson et al. ............. 454/19 |
| 5,332,925 | A | * | 7/1994 | Thomas ....................... 290/44 |
| 5,380,149 | A | * | 1/1995 | Valsamidis .................. 415/2.1 |
| 5,451,137 | A | * | 9/1995 | Gorlov .......................... 415/7 |
| 5,494,407 | A | * | 2/1996 | Benesh ................... 416/197 A |
| 5,669,811 | A | * | 9/1997 | Zaniewski ................... 454/16 |

* cited by examiner

Primary Examiner—Ninh H. Nguyen
(74) Attorney, Agent, or Firm—Blakely, Sokoloff, Taylor & Zafman; Stephen M. De Klerk

(57) ABSTRACT

A fan assembly includes a vertical axis wind turbine (VAWT) which is coupled to an air extraction or air supply fan. The VAWT is located above and is coupled coaxially to the fan. The fan assembly also includes an auxiliary turbine to provide start-up torque to initiate rotation of the VAWT. The VAWT is typically a Darrieus-type turbine and the auxiliary turbine is typically a Savonius-type turbine. In the preferred embodiments, the fan assembly includes a rotational speed governor to avoid damage to the turbine and/or fan in high winds.

25 Claims, 12 Drawing Sheets

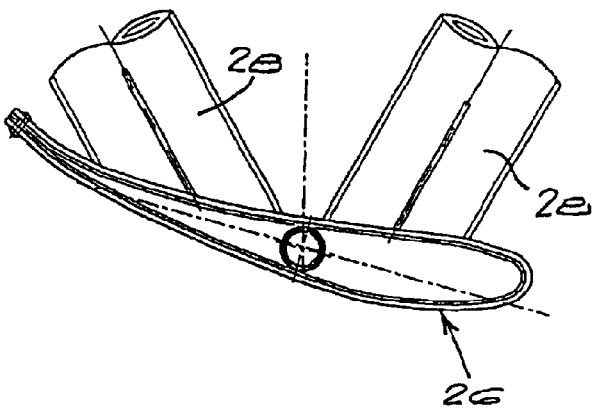
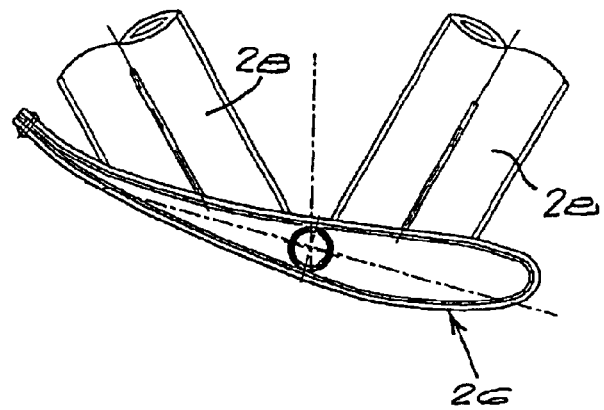
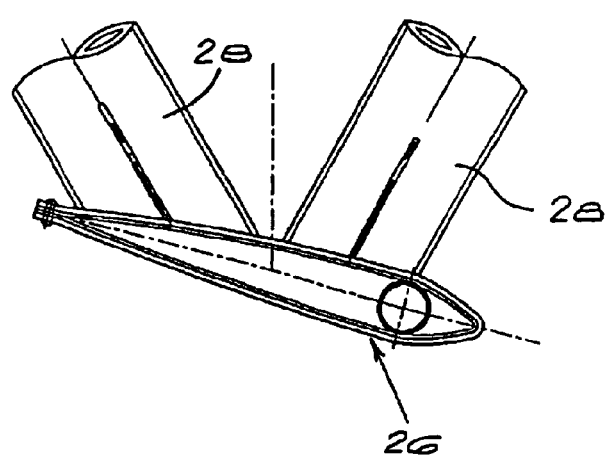
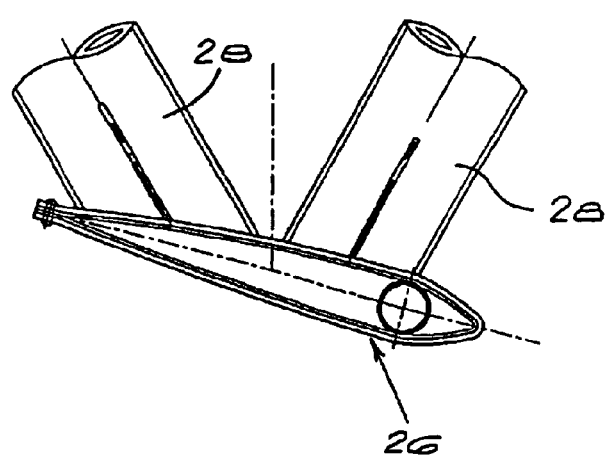
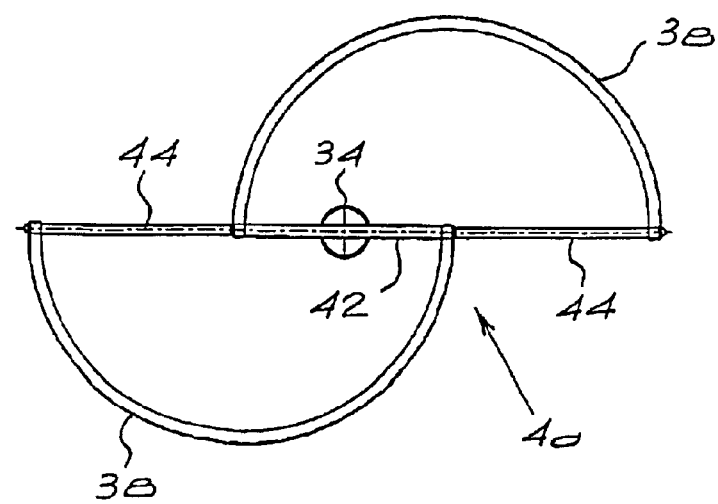
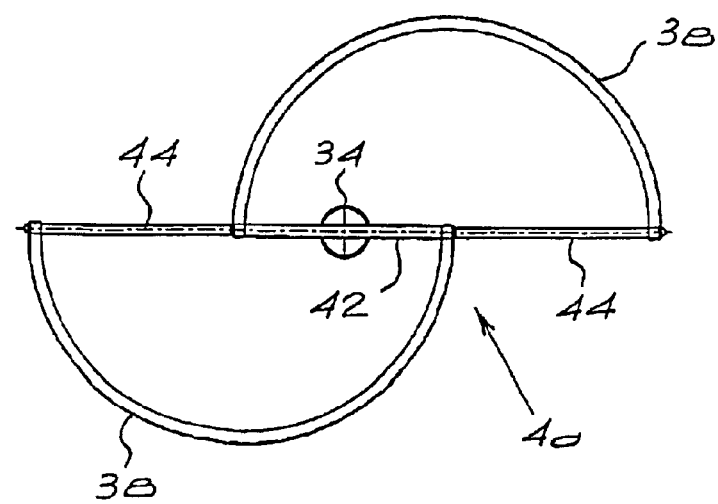

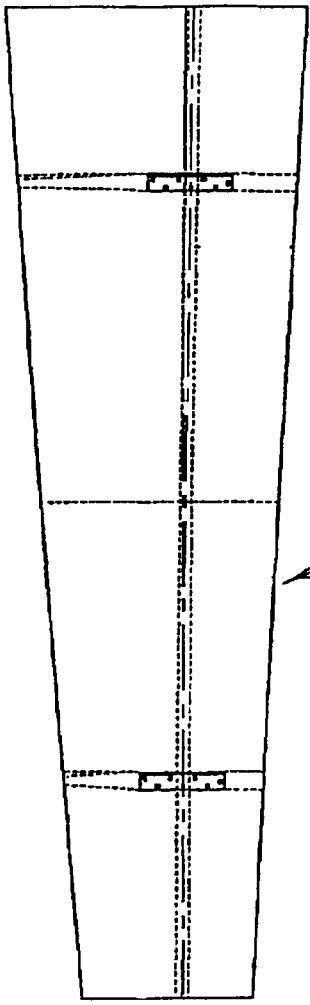

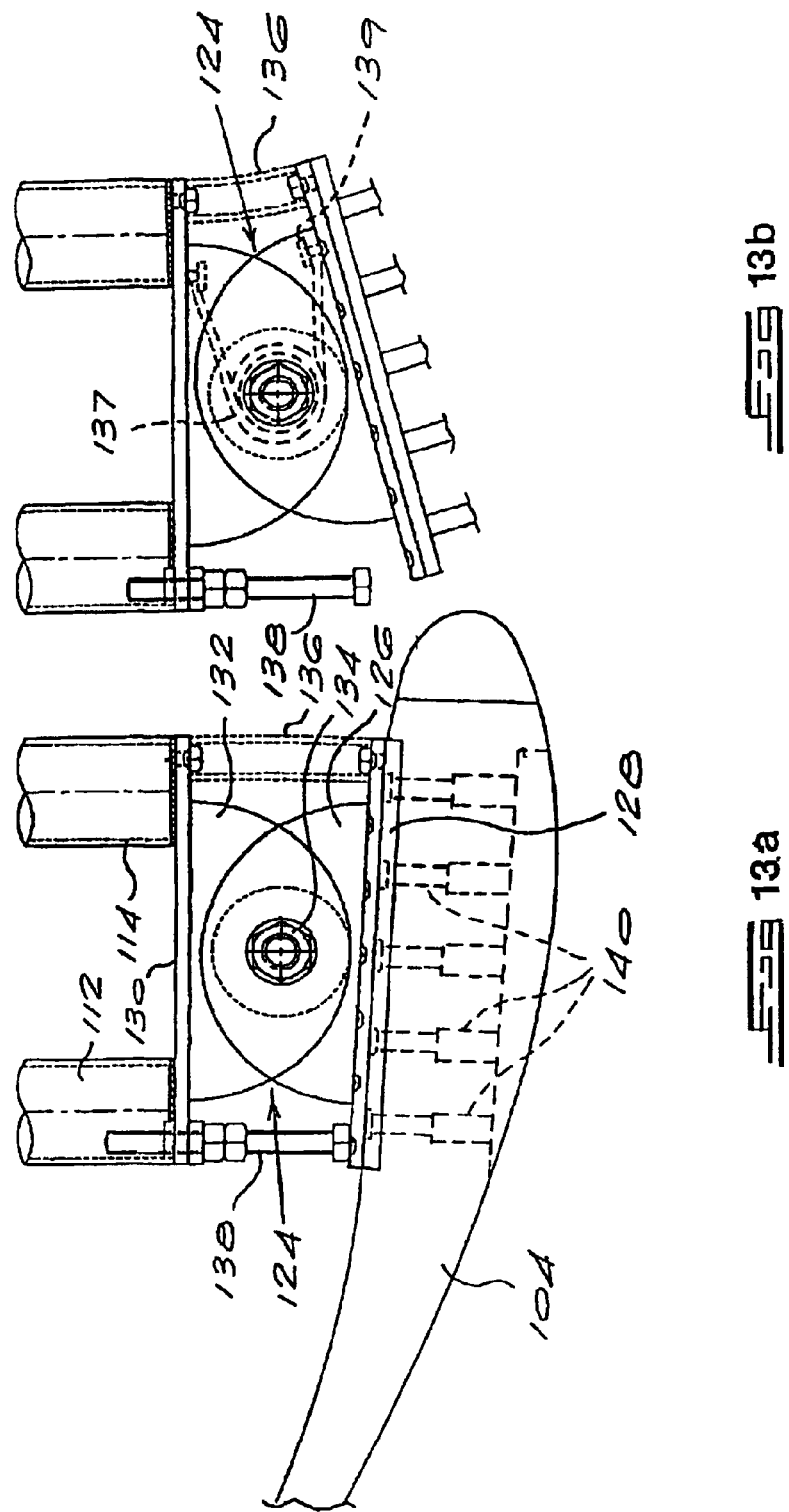

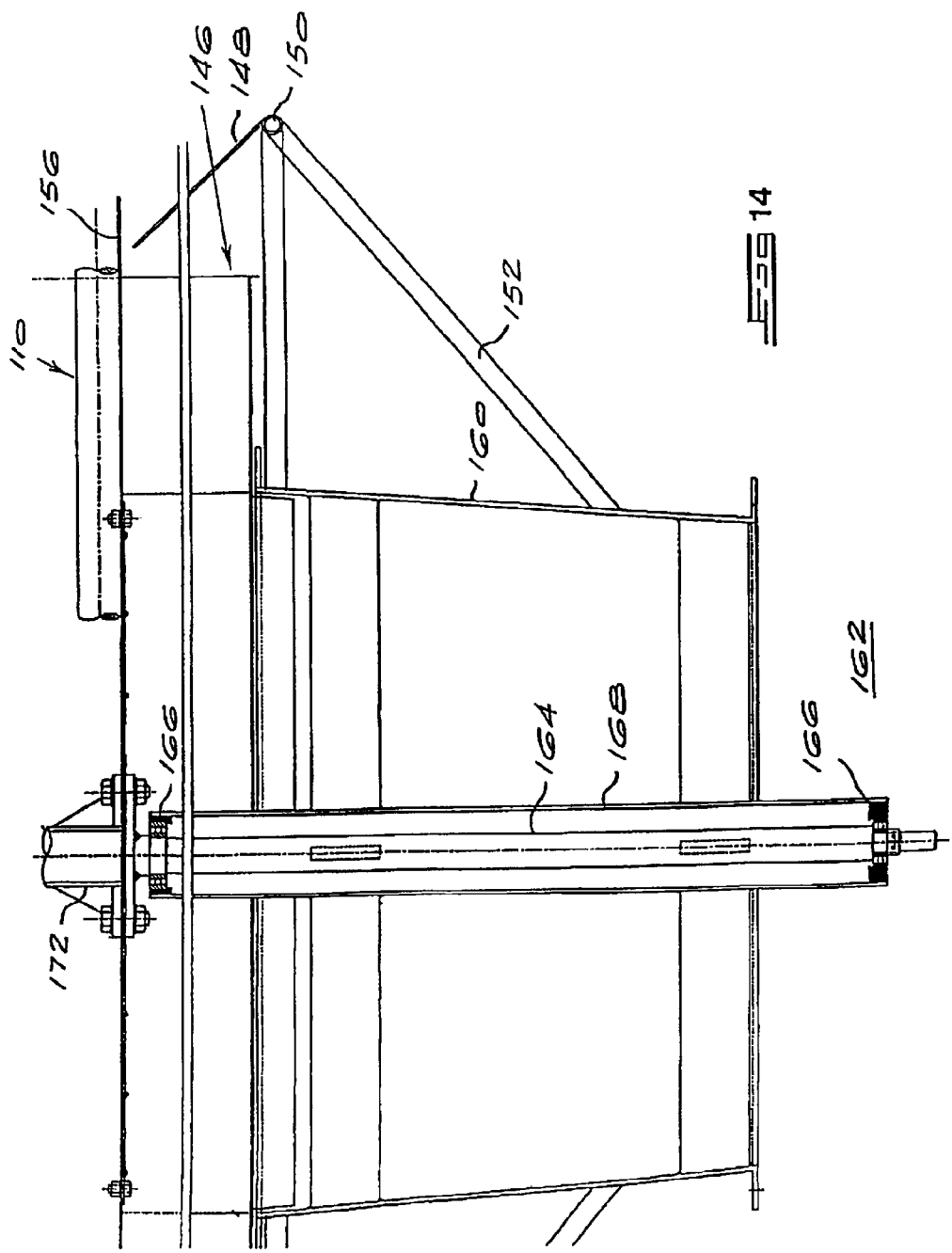

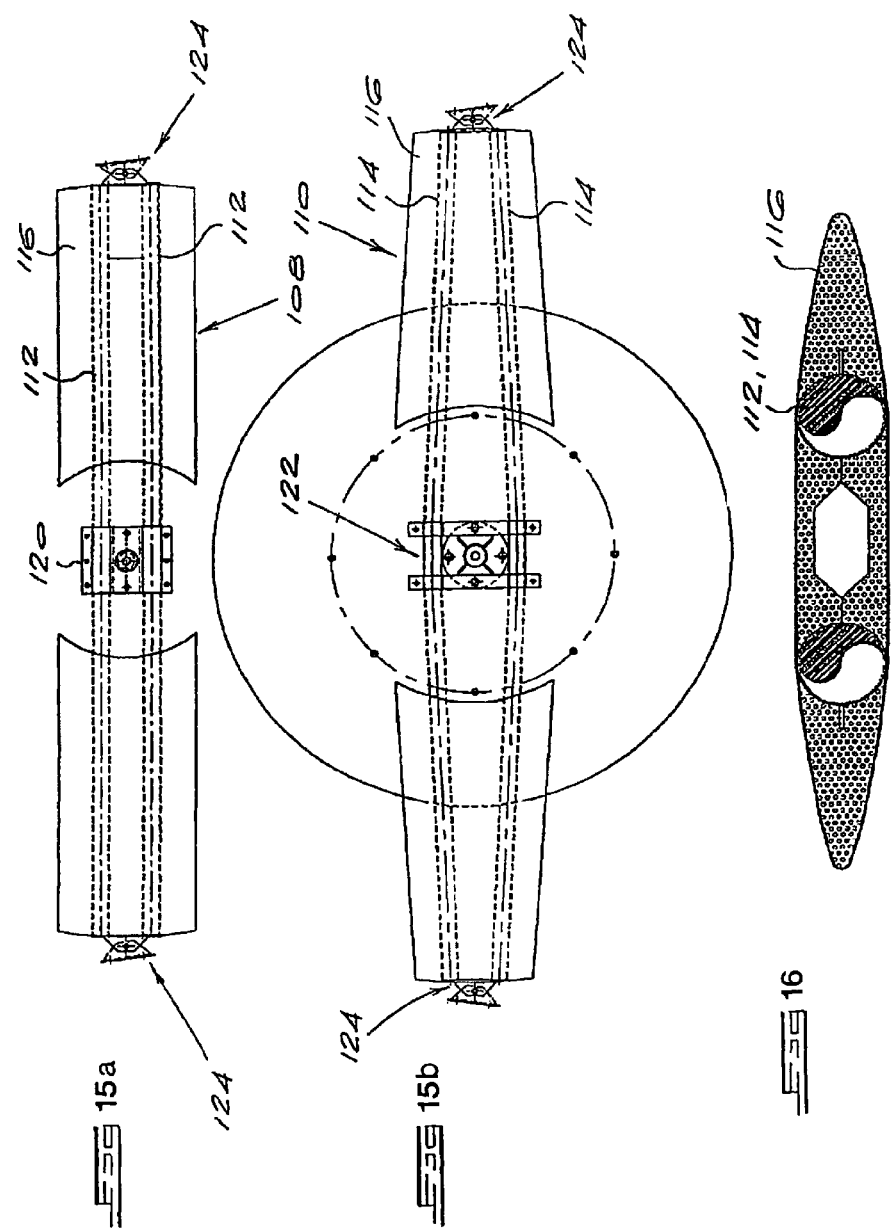

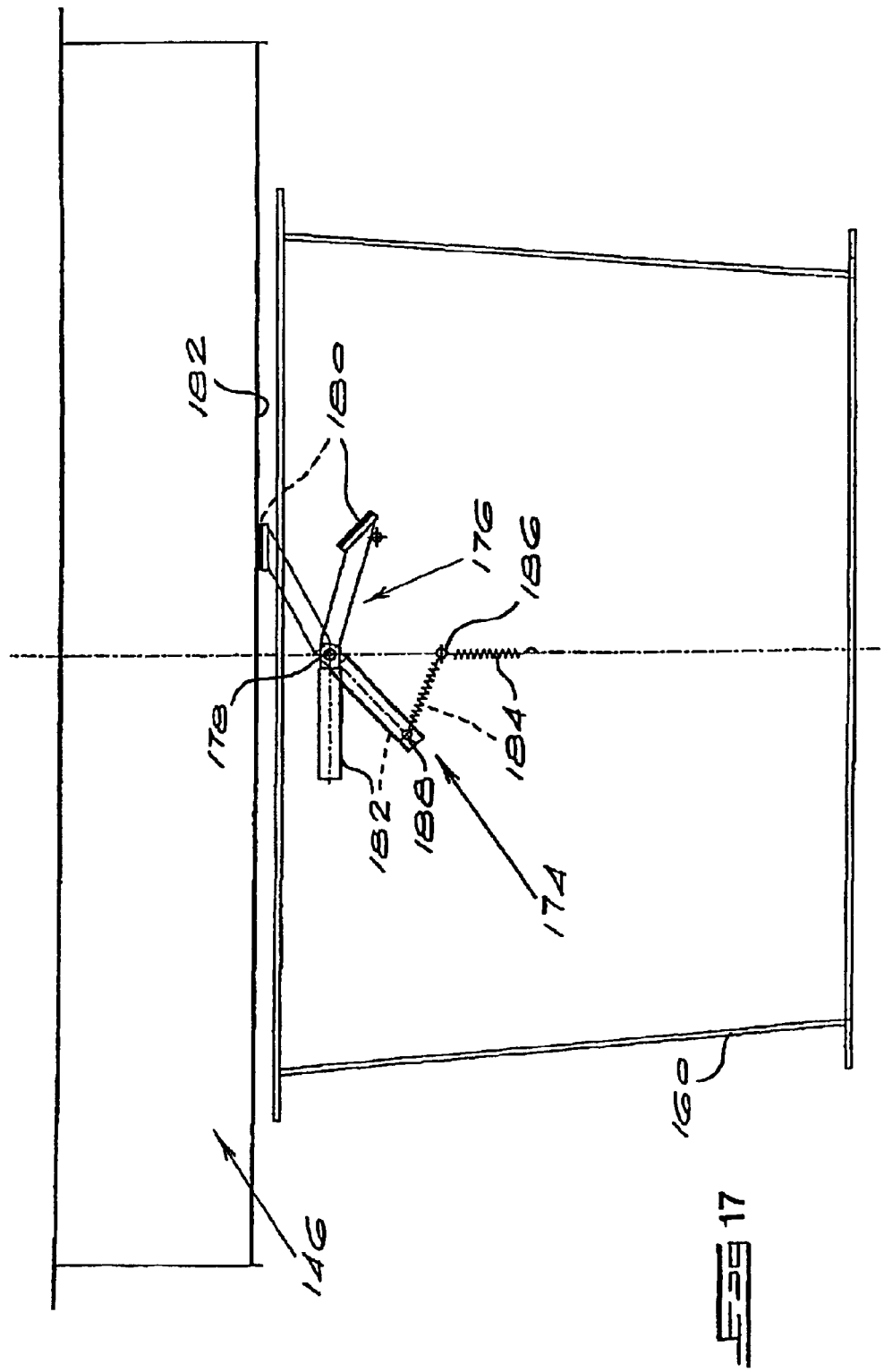

FAN ASSEMBLY

BACKGROUND TO THE INVENTION

This invention relates to a fan assembly.

An important application of the fan assembly of the invention is extraction of air from a building space or from ducting. In a specific application, the fan assembly may be mounted in or on the roof of a building to extract air from the building space below or from ducting in the building. A known fan assembly which is currently used in such applications is the so-called "Whirlybird", the main component of which is essentially a Savonius drag-type turbine. The turbine serves both to catch the wind and to extract air. Although fan assemblies of this type are in widespread use, they product a negligible pressure differential and are accordingly often unable to overcome the aerodynamic resistance to air flow through the space or ducting.

SUMMARY OF THE INVENTION

According to the present invention there is provided a fan assembly comprising an upright axis wind turbine coupled to a separate, upright axis air extraction or air supply fan to drive the fan.

In the preferred embodiment, there is a vertical axis wind turbine coupled coaxially, with or without intermediate gearing, to the fan. The preferred vertical axis wind turbine is a multi-blade Darrieus or Gyromill-type rotor with symmetrical or cambered aerofoil-profile blades. Start-up torque for the turbine may be provided by an auxiliary helical drag-type turbine, typically a Savonius-type turbine, on the axis of the main turbine.

Preferably the fan itself is a vertical axis, single-inlet fan the impeller of which has backward-curved aerofoil section fan blades.

According to a preferred feature, the assembly includes a rotational speed governor.

Other preferred features of the fan assembly are set forth in the appended claims.

BRIEF DESCRIPTION OF THE DRAWINGS

The invention will now be described in more detail, by way of example only, with reference to the accompanying drawings in which:

FIGS. 6(a) and 6(b) show alternative turbine blade aerofoil sections;

FIG. 7 shows a cross-section at the line 7—7 in FIG. 1;

FIG. 11 shows a side elevation of a turbine blade as used in the embodiment of FIG. 8;

FIG. 12 illustrates the internal structure of the turbine blade seen in FIG. 11;

FIGS. 13(a) and 13(b) illustrate a connection between a turbine blade and a spoke in the embodiment of FIG. 8;

FIG. 14 shows a detail of the fan assembly mounting in the embodiment of FIG. 8;

FIGS. 15(a) and 15(b) show plan views of modified top and bottom turbine blade spokes respectively;

FIG. 16 shows a typical cross-section of a modified turbine blade spoke as illustrated in FIG. 15(a) or 15(b);

FIG. 17 illustrates a handbrake which can be used in the embodiment of FIG. 8;

DESCRIPTION OF PREFERRED EMBODIMENTS

Figure 1:
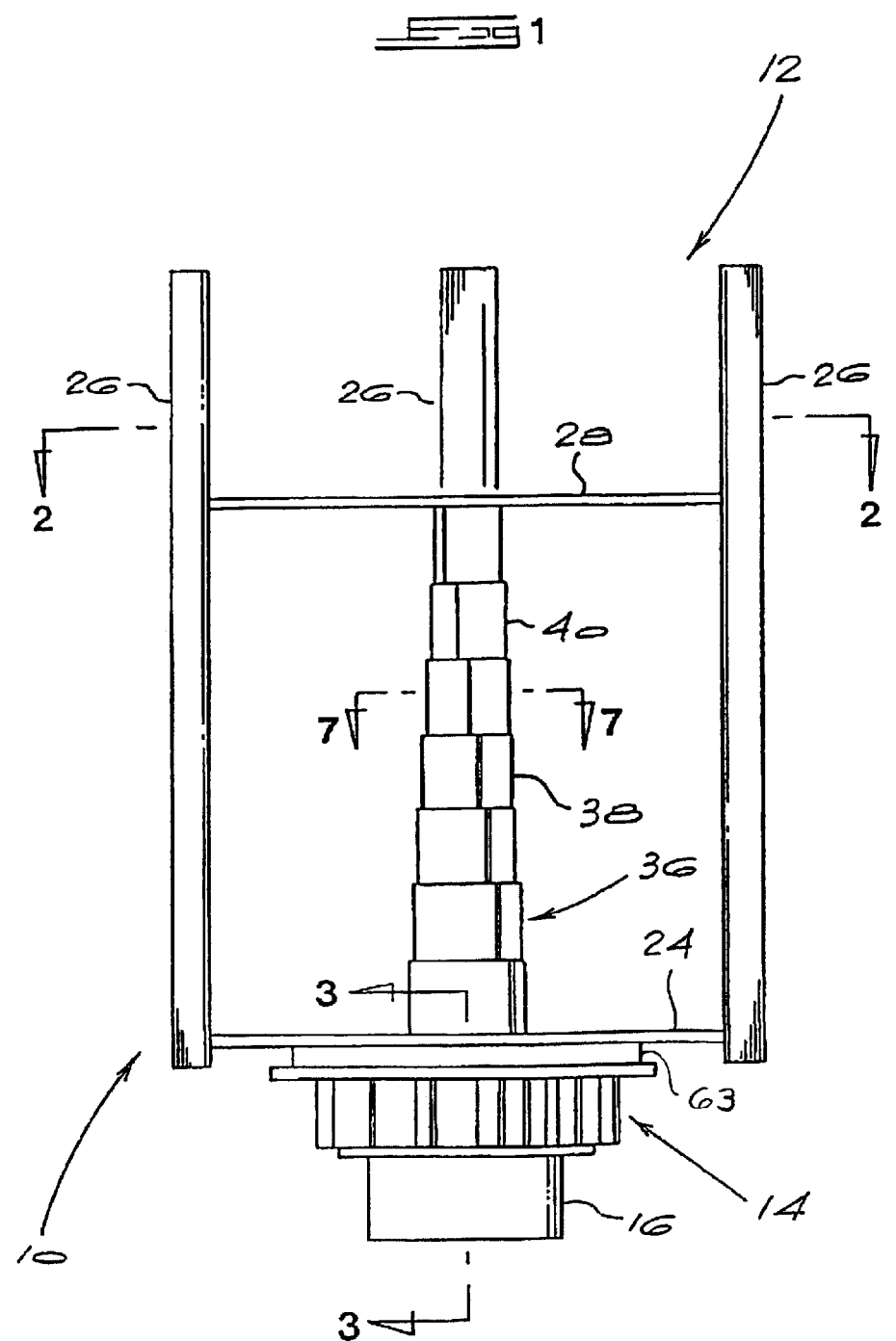
FIG. 1 shows a diagrammatic side elevation of a fan assembly according to this invention.
Figure 3:
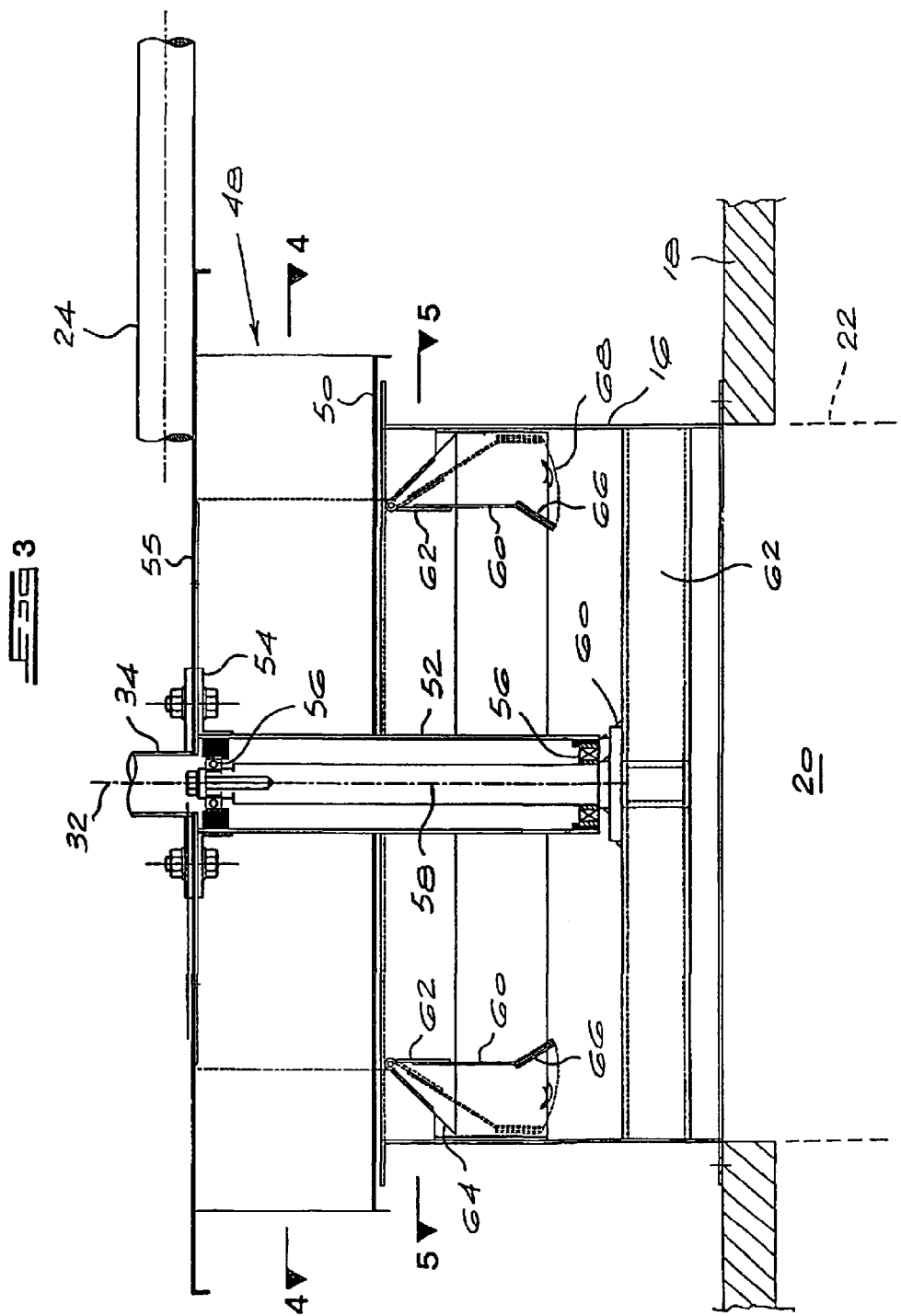
FIG. 3 shows a cross-section at the line 3—3 in FIG. 1.

The fan assembly 10 seen in FIG. 1 has, as its major components, a vertical axis wind turbine (VAWT) 12, an extraction fan 14 arranged coaxially with the VAWT and a round cylindrical duct 16. As shown in FIG. 3, the fan 14 is mounted on the duct 16 which is in use secured to a roof 18 with the interior of the duct in communication with a space 20 beneath the roof from which air is to be extracted. The broken lines in FIG. 3 indicate an alternative arrangement in which the duct 16 communicates with an air duct 22 beneath the roof.

Figure 2:
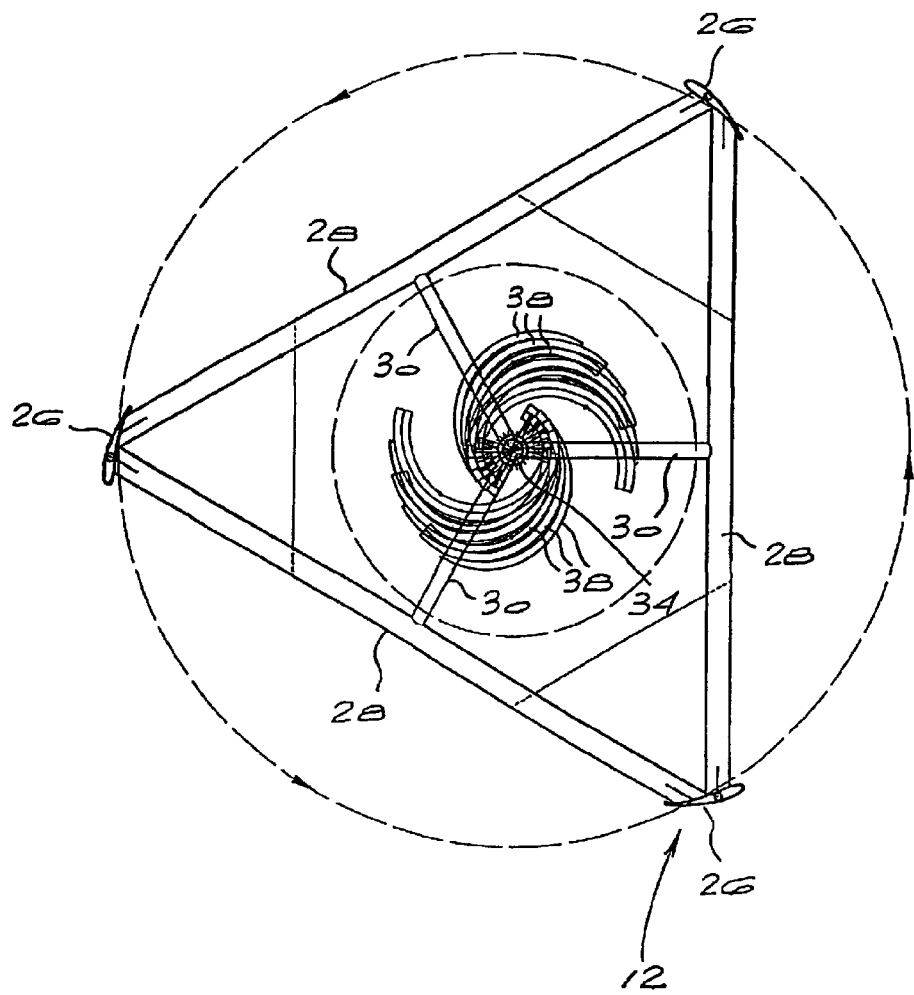
FIG. 2 shows a cross-section at the line 2—2 in FIG. 1.

The VAWT includes three vertically oriented, aerofoil section turbine blades 26 connected to one another at their lower ends by spars 24. In FIGS. 2 and 6(a) the blades 26 have a cambered aerofoil section while in the alternative configuration seen in FIG. 6(b) the blades have a symmetrical aerofoil section. At an elevated position, the three blades are connected to one another by spars 28. From the centre of each spar 28 a member 30 extends radially towards the axis 32 of the VAWT.

The inner ends of the members 30 are secured to a central shaft 34 on which an auxiliary turbine 36 is mounted between the main turbine blades 26, coaxially with the VAWT 12.

The auxiliary turbine 36 includes a stack of blades 38 which are of semi-circular section and arranged in pairs 40. As shown in FIG. 7, the inner ends of the individual blades in each pair, at each level, are supported by a rod 42 extending diametrically through the shaft 34 while their outer ends are supported by radial extensions 44 of the rod. As will be apparent from FIGS. 1 and 2, the blade pairs 40 are progressively, angularly off-set from one another, and the radius of curvature of the blades decreases, with increasing height in the stack.

The fan 14 includes a series of angularly spaced blades 46 forming an impeller 48. The lower edges of the blades 46 are secured to an annular base plate 50. The base plate 50 is connected to a tubular shaft 52 bolted through brackets 54 to a plate 55 to which the shaft 34 is secured and on which the spars 24 are mounted. The base plate 50 and accordingly the impeller 48 are thus rotationally fast with the VAWT. As illustrated in FIG. 3, the shaft 52 is supported rotationally in bearings 56 relative to a central stub shaft 58 welded at 60 to a spoked frame 62 spanning across the interior of the duct 16.

It will be understood that the VAWT 12 and auxiliary turbine 36 extend above the roof 18 and are exposed to ambient air movements. The auxiliary turbine 36 provides start-up torque to initiate rotation of the VAWT. In this regard it will be noted that the progressive angular offset of the various blade pairs 40 ensures that air movement is picked up by the auxiliary turbine irrespective of the direction of that movement.

The rotation of the VAWT is transferred directly to the fan impeller 48 which accordingly rotates at the same angular speed as the VAWT. Air is drawn axially out of the space 20 (or the duct 22) and is expelled outwardly by the impeller 48.

The use of a VAWT is an important feature of the invention. A turbine of this type has been shown to be tolerant of blustery wind conditions which are typically encountered in built-up areas. Added to this, it is recognised that efficient air extraction is dependent on the tip speed of the fan blades and hence on the rotational speed of the fan impeller. A Darrieus lift-type VAWT as described above can be shown to produce rotational speeds, in similar wind conditions, which are substantially higher than those achievable with a corresponding drag-type turbine. As a matter of design it will be understood that the VAWT will n practice be matched to the fan to achieve the best air extraction efficiency.

As further illustrated in FIG. 1, it is also possible to increase the tip speed of the impeller blades by including step-up gearing 63 between the VAWT and the fan impeller, although it is recognized that a gearbox may itself cause some overall loss of efficiency.

Figure 4:
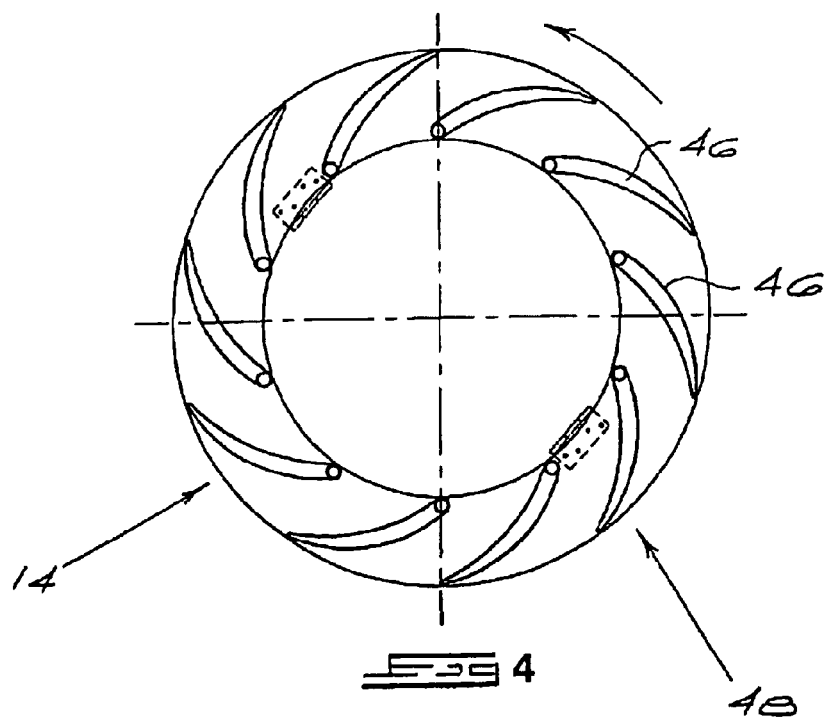
FIG. 4 shows a cross-section at the line 4—4 in FIG. 3.

Referring to FIG. 4, it will be seen that the impeller blades 46 are backwardly curved. By this is meant that for the indicated direction of rotation of the impeller, each blade 46 curves outwardly and away from the direction of forward motion. This features reduces the radial component of the motion which is imparted to the extracted air. Also, with backwardly curved impeller blades the impeller presents a minimal obstruction to the flow of air through the fan, and accordingly allows an acceptable air flow, induced merely by buoyancy of warm air relative to cool air in the space 22, to take place when there is insufficient air movement to rotate the VAWT at a meaningful speed.

In order to reduce the overall mass and hence rotational inertia of the VAWT and fan, it is preferred that these components, and in particular their blades, be made of aluminium. Another possibility under consideration is a lightweight balsa wood frame covered by a thin skin of appropriately tough material.

The cambered aerofoil profile seen in FIG. 6(*a*) is in general preferred to the symmetrical design of FIG. 6(*b*) since the cambered shape can be expected to provide some initial start-up torque to assist the auxiliary turbine to initiate rotation of the VAWT.

Referring to FIG. 3 it will be seen that members 60 are suspended on hinges 62 from a conical inlet 64 of the impeller 48. The members 60 carry respective brake shoes 66 at their ends. During rotation of the turbine and fan impeller, the members 60 will swing outwardly as indicated by the arrows 68, the extent of such swinging movement being dependent on the rotational speed and hence the centrifugal force. In high winds where excessive rotational speeds would otherwise be generated, the brake shoes 66 make frictional contact with the internal surface of the duct 16 to govern the rotational speed to within acceptable limits.

The fan assembly in the example described above serves an air extraction function. It will however be appreciated that a fan assembly according to the invention could also be used in an air supply mode. In this case, it would be appropriate to replace the illustrated fan impeller 48 with an axial or mixed flow impeller.

Figure 5:
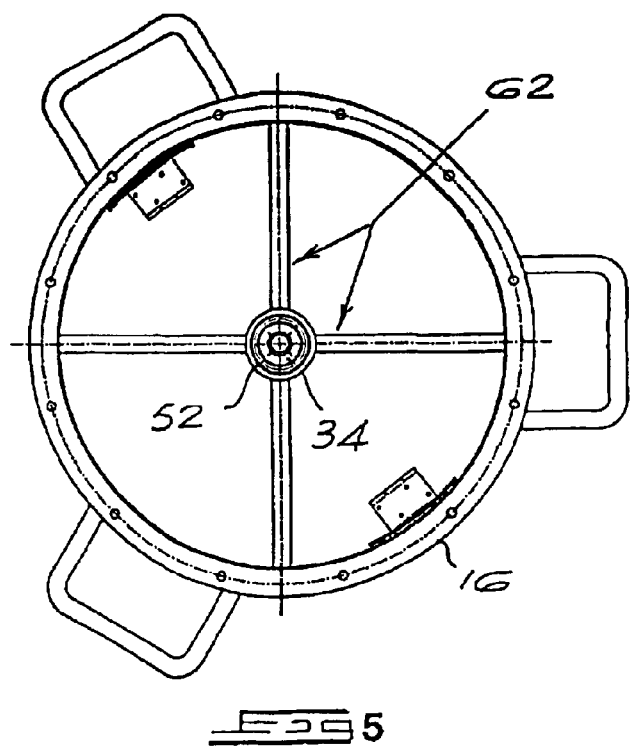
FIG. 5 shows a cross-section at the line 5—5 in FIG. 3.

Referring to FIG. 5 it will be seen that the duct 16 is provided with handles 70 for carrying the fan assembly or at least the lower components thereof.

In the embodiment described above and illustrated in FIGS. 1 to 7 the auxiliary turbine has a stepped helical construction. In other embodiments of the invention, one of which is described below, the auxiliary turbine can have a continuous helical shape.

FIGS. 8 to 19 illustrate a second embodiment of fan assembly, indicated generally by the numeral 100, according to the invention. The basic components of the assembly are the same as those of the first embodiment 10 described above. In this case the VAWT 102 has only two diametrically opposed turbine blades or wings 104 as opposed to the three blade configuration of the first embodiment. Each of the blades has a cambered aerofoil shape similar to that illustrated in FIG. 6(*a*). As illustrated in FIG. 11, each blade is tapered from top to bottom. Referring specifically to FIG. 12, each blade 104 includes an internal framework consisting of an internal spar 106.1, rods 106.2 and 106.3 at the leading and trailing edges rerspectively and a series of internal braces 106.4. The spar, rods and braces are made of carbon fibre. The internal framework is covered by woven glass fibre cloth.

The turbine blades 104 are supported at upper and lower positions by radial spars or spokes 108, 110 respectively. Each spoke includes two aluminium rods 112, 114. As shown in FIG. 15(*a*) the rods 112 of the upper spokes are parallel to one another. As shown in FIG. 15(*b*), the rods 114 of the lower spokes 110 are slightly convergent. For improved aerodynamic efficiency, the pairs of rods 112, 114 can be clad in elliptical cladding structures 116 as illustrated in FIG. 16. The spokes 108, 110 are connected to a central shaft 118 by brackets 120, 122.

In the first embodiment, the turbine blades 26 are rigidly connected to the ends of their supporting spars. However in this embodiment, the turbine blades 104 are connected to the ends of the spokes 108, 110 by means of hinges 124 which are illustrated in some detail in FIGS. 13(*a*) and 13(*b*). A holed bracket 126 projects inwardly from a transverse plate 128 secured to each blade at each connection point. Projecting outwardly from a transverse plate 130 at the outer end of each spoke is a corresponding holed bracket 132. The brackets 126, 132 are connected pivotally to one another by means of a bolt 134. Acting between the plates 128, 130 at a position to one side of the pivot point, i.e. the axis of the bolt 134, is a compression spring 136. A stop member 138 in the form of a bolt is attached to the plate 130 on the other side of the pivot point and extends towards the plate 128. In the position shown in FIG. 13(*a*) the spring 136 urges the plate 128 into abutment with the end of the stop member 138. The length of the stop member is set such that in this position of abutment, the associated turbine blade 104 is pitched for optimal aerodynamic efficiency, and the spring tension is selected to ensure that this pitch is maintained during normal operation of the turbine.

The pivot point 134 is off-set relative to the centre of gravity of the turbine blade such that with increasing blade velocity the blade has a tendency to pitch negatively as a result of increased centrifugal force acting on it. At a predetermined blade velocity, the bias of the spring 136 is overcome and the spring is compressed, as illustrated in FIG. 13(*b*), allowing the blade to assume a negative pitch. This reduces the aerodynamic efficiency of the blade. The negative pitch of the blade increases with increasing rotational velocity of the VAWT until eventually the situation is reached that the blade stalls aerodynamically. The VAWT is accordingly governed to a maximum safe rotational velocity.

It will be understood that the hinged nature of the turbine blades provides the VAWT with an automatically operating aerodynamic rotational speed governor which replaces the centrifugal braking arrangement of the first embodiment.

It will also be noted in FIG. 13(a) that each turbine blade is reinforced by transverse members 140 providing support for the plate 128.

Figure 18:
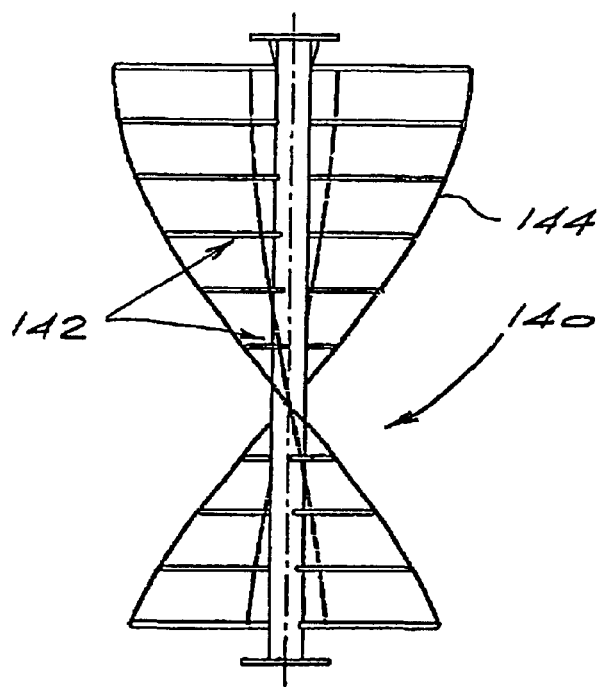
FIG. 18 shows a side elevation of the auxiliary turbine of the embodiment of FIG. 8.
Figure 19:
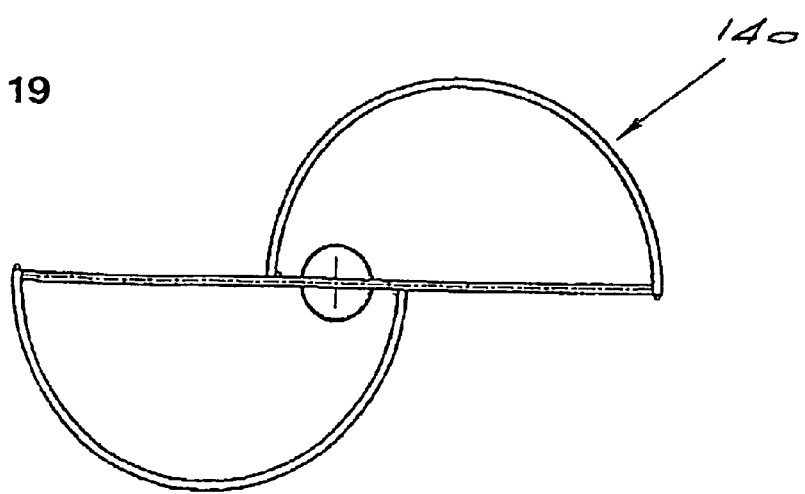
FIG. 19 shows a typical horizontal cross-sectional view of the auxiliary turbine of FIG. 18.

In the second embodiment, the Savonius-type auxiliary turbine of the first embodiment, having the stepped helical construction described above, is replaced by a Savonius-type auxiliary turbine 140 of continuous helical design. Referring to FIG. 18, the auxiliary turbine 140 includes an internal frame 142, of lightweight aluminium or glass-reinfroced plastic material, over which is stretched a skin of wind-impermeable fabric 144. As shown in FIG. 19 the internal frame has a similar configuration to that used in the first embodiment.

Figure 8:
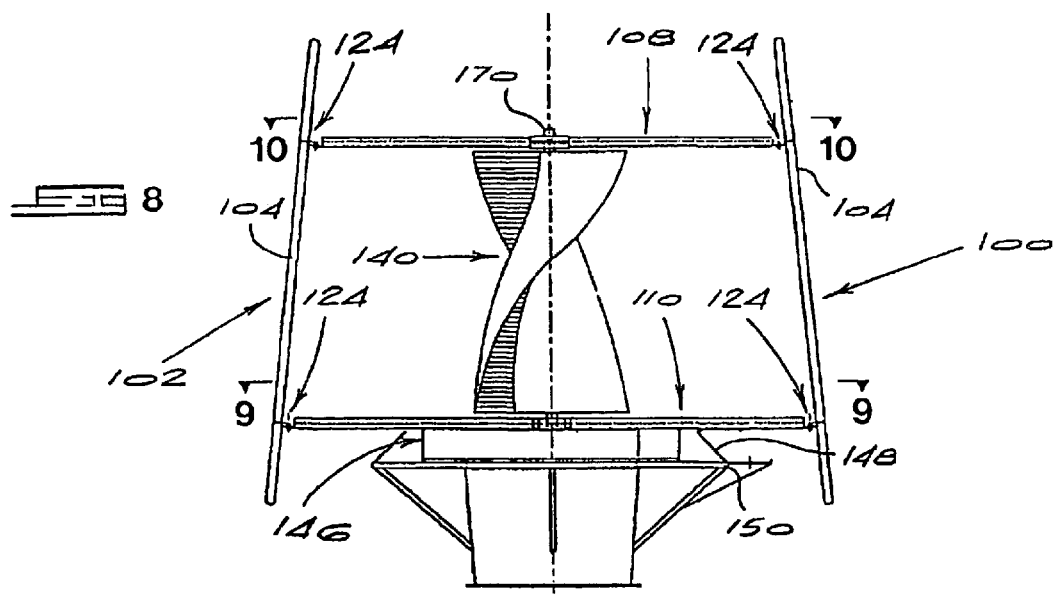
FIG. 8 shows a diagrammatic side elevation of a fan assembly according to a second embodiment of the invention.
Figure 9:
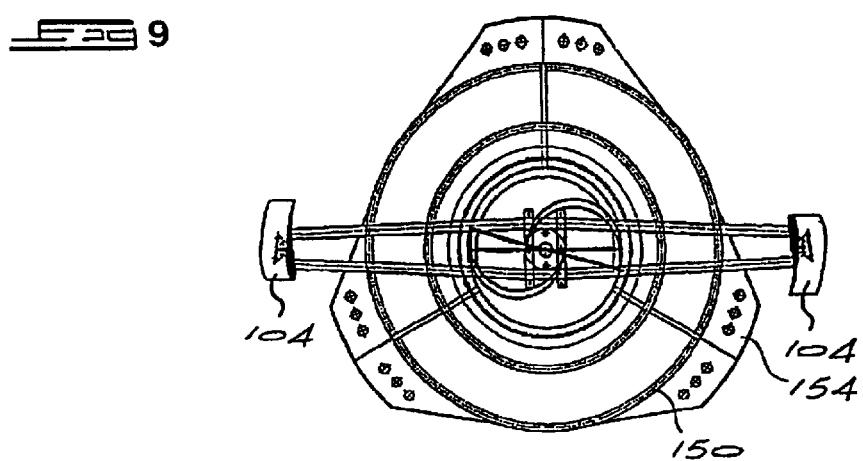
FIG. 9 shows a cross-section at the line 9—9 in FIG. 8.
Figure 10:
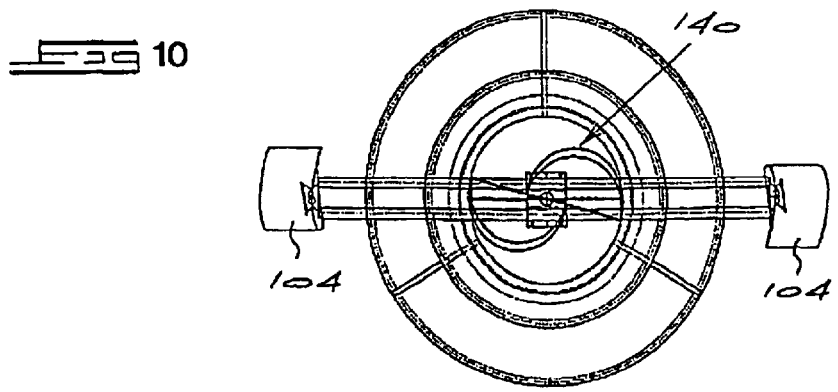
FIG. 10 shows a cross-section at the line 10—10 in FIG. 8.

The fan 146 of the second embodiment is generally similar to that of the first embodiment and its components are preferably of aluminium or glass-reinforced plastics As illustrated in FIGS. 8 and 14, the fan assembly 100 includes an outer frustoconical windshield 148 which surrounds the fan 146 and shields it from ambient wind movements. The windshield 148 is mounted on a ring 150 supported by braces 152. Foot support plates 154 project transversely from the ring 150 to provide platforms for personnel to stand on during maintenance or inspection of the fan assembly. In addition the ring also provides a convenient structure for lifting the assembly when necessary and serves as a bumper to protect the assembly during transportation and handling. In addition the ring could be used to support a volute casing to serve as an air supply plenum in those instances where the fan assembly of the invention is used in an air supply mode as opposed to air extraction mode.

Referring to FIG. 14, the fan is surmounted by an upper plate 156 which is of somewhat greater diameter than the fan impeller itself, to prevent ingress of rainwater through the fan. The duct 160 which communicates with the space 162 from which extraction is to take place is typically of mild steel and is provided with a taper to optimise air flow into the fan.

FIG. 14 also illustrates that the fan shaft 164, which in this case rotates in bearings 166 in a casing 168, is extended downwardly to a position well beneath the fan 146 and duct 160. The lower end of the shaft serves as a rotary power take-off and can be used to provide rotary power applications other than air extraction or air supply, such as electrical power generation, grain milling or water pumping.

A lifting eye 170 is provided at the upper end of the central shaft 172 of the VAWT and auxiliary turbine to facilitate mechanical lifting of the fan assembly.

Referring to FIG. 17, the fan assembly 100 also includes a handbrake mechanism 174. This mechanism has a lever 176 pivoted at 178 and carrying a brake pad 180 at one end and a handle 182 at the other end. The handle can be pushed down manually to urge the brake pad 180 upwardly against a plate 182 forming the bottom of the fan impeller thereby to slow down and eventually stop the turbine and fan when maintenance or inspection of the rotary components is necessary. The braking position of the mechanism is illustrated in broken outline.

The mechanism also includes a spring 184 supported loosely on a pin 186. When the handbrake is inoperative the spring merely hangs vertically. However when the handbrake is to be held in an applied condition, for instance during maintenance, the spring is swung upwardly and is hooked onto a pin 188 on the handle to hold the handle down.

Referring again to FIG. 13(b) there is shown, in broken outline, a modification to the turbine speed governor in which the helical compression spring 136 is replaced by a torsion spring 137 which is wrapped around the pivot axis with it ends hooked around detents 139 on the turbine blade 104 and spoke respectively. The spring 137 holds the turbine blade at an efficient orientation at acceptable turbine speeds but will deflects to allow the blade to pitch negatively in the event of excessive turbine speeds due, for instance, to excessively high wind speeds.

The invention also envisages another type of governor in which the turbine blade itself incorporates a control surface which will stand proud of the blade surface, at excessively high rotary speeds, to pitch the blade negatively or slow it down.

What is claimed is:

1. A fan assembly comprising a vertical axis wind turbine including a multi-blade Darrieus or Gyromill-type rotor coupled to a separate, upright axis air extraction or air supply fan to drive the fan.

2. A fan assembly according to claim 1 wherein the vertical axis wind turbine is coupled coaxially to the fan.

3. A fan assembly according to claim 2 wherein the vertical axis wind turbine is coupled to the fan via intermediate gearing which increases the rotary speed of the fan relative to that of the turbine.

4. A fan assembly according to claim 1 wherein the vertical axis wind turbine includes angularly spaced, vertically oriented aerofoil-profile turbine blades which are symmetrical or cambered in cross-section.

5. A fan assembly according to claim 1 and comprising rotational speed governing means to limit the rotational speed of the turbine.

6. A fan assembly according to claim 5 wherein the speed governing means comprises a braking member carried by a rotating component of the fan assembly and arranged to be moved, by centrifugal forces, against a stationary part of the fan assembly when the rotary speed of that component exceeds a predetermined value.

7. A fan assembly according to claim 6 wherein the fan includes an impeller relative to which the braking member is connected pivotally.

8. A fan assembly according to claim 5 wherein the turbine blades are connected pivotally to radial spokes at upright pivot axes about which the blades can pivot relative to the spokes.

9. A fan assembly according to claim 8 wherein the spokes comprise elongate rods encased in aerodynamically shaped casings.

10. A fan assembly according to claim 8 wherein the pivot axes are off-set from the centers of gravity of the associated turbine blades, the off-set being such that when the turbine rotates centrifugal forces tend to urge the blades to assume a negative pitch.

11. A fan assembly according to claim 10 and comprising springs biasing the turbine blades towards orientations of efficient pitch, the springs being selected for their bias to be overcome when the rotary speed of the turbine exceeds a predetermined value, whereby when the predetermined rotary speed of the turbine is exceeded the springs allow the blades to assume a negative pitch, thereby decreasing the efficiency of the turbine.

12. A fan assembly according to claim 1 and comprising an auxiliary turbine coupled to the vertical axis wind turbine to provide start-up torque to initiate rotation of the vertical axis wind turbine.

13. A fan assembly according to claim 12 wherein the auxiliary turbine has a vertical axis of rotation and is coupled coaxially to the vertical axis wind turbine and to the fan.

14. A fan assembly according to claim 13 wherein the vertical axis wind turbine comprises angularly spaced, vertically oriented turbine blades which are spaced radially from the axis of rotation of the turbine, and the auxiliary turbine is located on that axis.

15. A fan assembly according to claim 14 wherein the auxiliary turbine is a Savonius-type turbine.

16. A fan assembly according to claim 15 wherein the turbine is of stepped helical construction.

17. A fan assembly according to claim 15 wherein the auxiliary turbine is of continuous helical construction.

18. A fan assembly according to claim 1 wherein the fan comprises an axial inlet, radio exhaust fan impeller which includes a plurality of blades that are backwardly swept relative to the direction of rotation of the impeller.

19. A fan assembly according to claim 18 comprising a windshield located about the radial exhaust of the fan.

20. A fan assembly according to claim 18 wherein the inlet of the fan impeller is coupled to a vertical duct extending from a space from which air is to be extracted.

21. A fan assembly according to claim 20 wherein the duct is downwardly tapered.

22. A fan assembly according to claim 20 comprising a support ring supported off the duct and surrounding it, the support ring supporting the windshield.

23. A fan assembly according to claim 22 wherein the ring carries foot support platforms on which personnel can stand.

24. A fan assembly according to claim 20 wherein the impeller is mounted on a central shaft which is supported on bearings in the duct and which extends to a position beneath the duct to provide a rotary power take-off.

25. A fan assembly according to claim 1 comprising a manually operable brake, acting between the duct and the fan impeller, to brake the fan impeller.

* * * * *